United States Patent [19]

Vincent

[11] Patent Number: 5,431,831
[45] Date of Patent: Jul. 11, 1995

[54] COMPRESSIBLE LUBRICANT WITH MEMORY COMBINED WITH ANAEROBIC PIPE SEALANT

[76] Inventor: Larry W. Vincent, 25025 I-45 North, Suite 415, The Woodlands, Tex. 77380

[21] Appl. No.: 127,291

[22] Filed: Sep. 27, 1993

[51] Int. Cl.$^6$ .......................................... C10M 125/02
[52] U.S. Cl. ...................................... 252/29; 106/33; 285/94
[58] Field of Search ............... 252/29; 106/33; 285/94

[56] References Cited

U.S. PATENT DOCUMENTS

| | | | |
|---|---|---|---|
| 2,335,958 | 12/1943 | Parker | 252/29 |
| 4,026,976 | 5/1977 | Anderson | 106/33 |
| 4,195,001 | 3/1980 | Lytton | 106/33 |
| 4,731,982 | 3/1988 | Grant et al. | 106/33 |
| 4,813,714 | 3/1989 | Fairey et al. | 285/94 |
| 5,085,700 | 2/1992 | Howard | 252/29 |
| 5,180,509 | 1/1993 | Jacobs | 252/29 |

FOREIGN PATENT DOCUMENTS 352143A  1/1990  European Pat. Off. ............. 106/33

Primary Examiner—Jacqueline V. Howard
Attorney, Agent, or Firm—Kenneth A. Roddy

[57] ABSTRACT

A compressible graphite lubricant having a memory suspended in an anaerobic adhesive pipe sealant mixture of a polymerizable liquid acrylate ester monomer and a peroxy polymerization initiator. The graphite particles are formed of expanded graphite which gives the pipe sealant both compressibility and lubricating characteristics. The compound has the ability to change from a liquid with sufficient lubricity to assemble standard API and premium threaded connections without galling and then transform and fix itself into a continuous solid blocking or sealing agent in the gaps of the thread form. The expanded (compressible) graphite has a memory and, as part of the anaerobic fixing compound, allows the pipe sealant to maintain its sealing integrity under cycling of tension, compression, bending, and thermal expansion and contraction. The ability of the compressible lubricant/pipe sealant compound to maintain sealing integrity under cycling of tension, compression, bending, and thermal expansion and contraction loads makes it particularly suitable for use in vertical and horizontal oil and gas wells using oil country tubular goods tubing, casing, and drill pipe joint. An additional aspect of the invention involves a threaded pipe having a compressible lubricant/pipe sealant as described above deposited on at least a part of the threaded portion thereof.

21 Claims, 1 Drawing Sheet

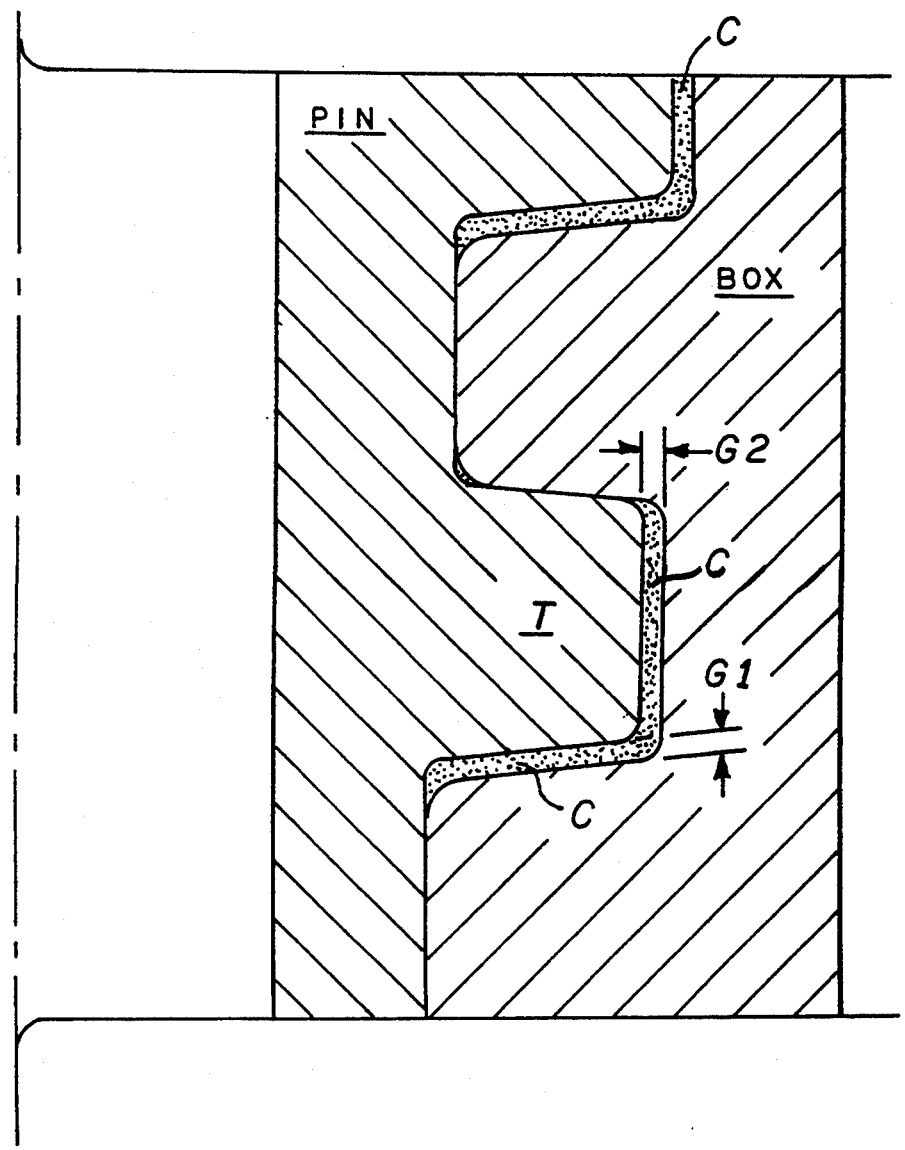

COMPRESSIBLE LUBRICANT WITH MEMORY COMBINED WITH ANAEROBIC PIPE SEALANT

BACKGROUND OF THE INVENTION

FIELD OF THE INVENTION

This invention relates generally to pipe sealants, and more particularly to a compressible graphite lubricant having a memory suspended in an anaerobic adhesive mixture of a polymerizable liquid acrylate ester monomer and a peroxy polymerization initiator.

BRIEF DESCRIPTION OF THE PRIOR ART

Pipe sealants are playing a progressively more important role in the production and maintenance portions of today's industry. The term, "pipe sealants" frequently refers not only to non-curing lubricants, but also to related materials which cure to "seal and lock" adjacent surfaces. One of the most important types of pipe sealants, particularly in the metal-working and pipe industry, is the class of anaerobic (without air) pipe sealants. These are pipe sealants which remain liquid in the presence of air (oxygen), but which polymerize upon the exclusion of air to form solid resins with excellent sealing properties. Since air is automatically excluded between mating surfaces of metal pipes, these pipe sealants are particularly useful in applications involving metal pipes.

As with other pipe sealants, anaerobics conventionally are applied in the liquid state to allow the sealant to contact and "wet" the surfaces to be sealed, and they may contain graphite as a lubricating agent to enable the pipe joints to be more easily tightened.

Bachmann, U.S. Pat. No. 3,814,156 discloses a sealing or bonding coating on at least a portion of the threaded area of a threaded fastening member. The coating comprises an anaerobic adhesive and a torque-tension control substance selected from the group of consisting of oily or waxy organic compounds, powdered carbon, soft metallic flake or powder, powdered or flaked thermoplastic polymers, and finely divided inorganic powders. The inventor was a co-inventor of U.S. Pat. No. 4,813,714, incorporated herein by reference, which discloses an anaerobic pipe sealant composition which utilizes powders of PTFE (polytetrafluoroethylene), commonly known as "Teflon" as a key ingredient in combination with an anaerobic resin to increase lubricity during make-up and break-out of threaded connections. Teflon and Teflon powder is substantially "non-compressible" and when used in premium metal-to-metal threaded connections increases the hoop stress in the interference fit. Also, Teflon does not degrade in the environment.

Howard, U.S. Pat. No. 4,872,914 discloses a non-polymerizing pipe thread sealant paste comprising from about 30% to about 80% by weight of natural flake graphite particles and a liquid carrier comprising a mixture of mineral oil and petrolatum. The paste composition has a total ash content of no greater than about 1% by weight and contains leachable chlorides in amounts equal to or less than about 50 parts per million. Howard specifically teaches away from "expanded" graphite flakes and polymerization.

Cox, U.S. Pat. No. 4,162,078 discloses an injectable "high temperature" packing formulation comprising flexible "expanded" graphite particles and a liquid lubricant. The Cox formulation is thermally stable and non-polymerizing. The expanded graphite particles used in the packing are fairly large in size, varying in length up to about 0.250 inches and the smallest particles used are of a size to pass through a 30 U.S. Standard sieve (0.0234 inch). The liquid lubricant used in the formulation may be a synthetic oil such as a silicone fluid and is employed in amounts ranging from about 5% by weight to about 35% by weight based on the total weight of the flexible graphite and lubricant.

A flexible graphite tape produced under the trade name "Grafoil" by Union Carbide Corporation of Danbury, Conn. is similar to flexible graphite sheets described in the Cox patent. The flexible "Grafoil" tape is thermally stable and is relatively thick (approximately 0.006 inch) and cannot be used with some pipe fittings because there is not enough space within the pipe threads to accommodate the relatively thick tape.

While the use of graphite as a lubricating agent in a pipe sealant has been recognized as a desirable objective, the problem of the non-compressible nature of the graphite particles has not been addressed. The non-compressible graphite particles tend to keep the mating thread surfaces of the pipe from coming very close to each other. Since "anaerobic" pipe sealants require closely fitting metal surfaces to exclude the air allowing them to polymerize and form solid resins which "seal and lock" the adjacent surfaces, conventional natural flake graphite particles can prevent the pipe sealant from sealing properly.

Pipe dope and greases used in threaded connections for oil country tubular goods (OCTG) often contain heavy metals such as lead, zinc or copper. The metal elements in these types of greases work as a leak barrier by piling up and plugging the clearance of threads and seals. Lead and zinc are soft metals with a low melting point, and tend to melt at the surface of metal/metal contact. These types of greases will sometimes flow out with mud or lubricant at the time of connection make-up which results in loss of sealing integrity and possible contamination of the environment.

It also often occurs in the harsh environment in which drilling operations take place, that the liquid component of conventional pipe dope, sealants, and greases will bake off in the extreme heat to which it is exposed, leaving voids and the metallic components behind. These components typically have particle sizes ranging from 50 to 500 microns. This is not only undesirable during normal drilling operations, but becomes even more of a problem during disassembly of the pipe. The same pipe is customarily reused due to the expense of the pipe. In instances where the lubricant has baked off, the metallic particles left behind are of a gritty consistency and, upon disassembly, sometimes causes galling to occur on the threads of the pipe which causes the pipe to be more difficult to disassemble and severely limits the reusability of the pipe.

Recently, compound greases have been developed for oil country tubular goods (OCTG) which substitute graphite grains for the metal compounds to plug the thread clearances and prevent contamination of the natural environment. However, graphite is known to be hard and sometimes will produce galling or scratches on the surface of the connection and the seals and, as a result, some of the greases containing graphite have reduced sealing capability, particularly in API buttress and metal-to-metal premium connections.

The above-described problems are overcome by the present invention which is distinguished over the prior art in general and these patents in particular by a compressible graphite lubricant having a memory suspended in an anaerobic adhesive pipe sealant mixture of a polymerizable liquid acrylate ester monomer and a peroxy polymerization initiator. The graphite particles are formed of expanded graphite which gives the pipe sealant both compressibility and lubricating characteristics. The compound has the ability to change from a liquid with sufficient lubricity to assemble standard API and premium threaded connections without galling and then transform and fix itself into a continuous solid blocking or sealing agent in the gaps of the thread form. The expanded (compressible) graphite has a memory and, as part of the anaerobic fixing compound, allows the pipe sealant to maintain its sealing integrity under cycling of tension, compression, bending, and thermal expansion and contraction. The ability of the compressible lubricant/pipe sealant compound to maintain sealing integrity under cycling of tension, compression, bending, and thermal expansion and contraction loads makes it particularly suitable for use in vertical and horizontal oil and gas wells using oil country tubular goods tubing, casing, and drill pipe. An additional aspect of the invention involves a threaded pipe joint having a compressible lubricant/pipe sealant as described above deposited on at least a part of the threaded portion thereof.

SUMMARY OF THE INVENTION

It is therefore an object of the present invention to provide a compressible lubricant having a memory combined with an anaerobic pipe sealant composition which remains liquid in the presence of air (oxygen), but which will polymerize upon the exclusion of air to form solid resins with excellent sealing properties.

It is another object of this invention to provide a compressible lubricant having a memory combined with an anaerobic pipe sealant composition having the ability to change from a liquid with sufficient lubricity to assemble standard API and premium threaded connections without galling and then transform and fix itself into a continuous compressible blocking or sealing agent in the gaps of the thread form to seal between the threads and prevent spiral leak paths.

Another object of this invention is to provide a compressible lubricant having a memory combined with an anaerobic pipe sealant composition having resiliency and compressibility characteristics which will maintain its sealing integrity under cycling of tension, compression, bending, and thermal expansion and contraction loads.

Another object of this invention is to provide a compressible lubricant having a memory combined with an anaerobic pipe sealant composition which is particularly useful for use in pipe connections used in vertical and horizontal oil and gas wells.

A further object of this invention is to provide a compressible lubricant having a memory combined with an anaerobic pipe sealant composition which may be applied easily and quickly by conventional means such as by brushing, mechanical applicator, ribbon applicator, or sponge.

A still further object of this invention is to provide a compressible lubricant having a memory combined with an anaerobic pipe sealant composition which is shelf stable and capable of withstanding normal storage and shipping conditions.

Other objects of the invention will become apparent from time to time throughout the specification and claims as hereinafter related.

The above noted objects and other objects of the invention are accomplished by a compressible graphite lubricant having a memory suspended in an anaerobic adhesive pipe sealant mixture of a polymerizable liquid acrylate ester monomer and a peroxy polymerization initiator. The graphite particles are formed of expanded graphite which gives the pipe sealant both compressibility and lubricating characteristics. The compound has the ability to change from a liquid with sufficient lubricity to assemble standard API and premium threaded connections without galling and then transform and fix itself into a continuous solid blocking or sealing agent in the gaps of the thread form. The expanded (compressible) graphite has a memory and, as part of the anaerobic fixing compound, allows the pipe sealant to maintain its sealing integrity under cycling of tension, compression, bending, and thermal expansion and contraction. The ability of the compressible lubricant/pipe sealant compound to maintain sealing integrity under cycling of tension, compression, bending, and thermal expansion and contraction loads makes it particularly suitable for use in vertical and horizontal oil and gas wells using oil country tubular goods tubing, casing, and drill pipe. An additional aspect of the invention involves a threaded pipe joint having a compressible lubricant/pipe sealant as described above deposited on at least a part of the threaded portion thereof.

BRIEF DESCRIPTION OF THE DRAWING

The sole drawing is a portion of a thread detail in a threaded connection with API buttress threads showing the compressible lubricant/pipe sealant in the gaps of the threaded connection.

DESCRIPTION OF THE PREFERRED EMBODIMENT

The present invention is a compressible graphite lubricant having a memory suspended in an anaerobic adhesive pipe sealant composition which comprises a mixture of a polymerizable liquid acrylate ester monomer and a peroxy polymerization initiator. The preferred monomers used in the compound are polymerizable liquid acrylate esters. As used herein, "acrylate esters" include alpha-substituted acrylate esters, such as the methacrylic and chloroacrylic esters. Monomers of this type, when mixed with a peroxy initiator, as described below, form desirable sealants of the anaerobic type.

Anaerobic sealants are those which remain stable (liquid) in the presence of air (oxygen), but which when removed from the presence of air will polymerize to form hard, durable resins with excellent sealing properties. This type of sealant is particularly adaptable to the bonding of metals and other nonporous permeable materials since they exclude atmospheric oxygen from contact with the sealant, and therefore the sealant polymerizes to bond the surface together. Of particular utility as adhesive monomers, are polymerizable di-and other polyacrylate esters since, because of their ability to form cross-linked polymers, they have more highly desirable adhesive properties. However, monoacrylate esters can be used, particularly if the nonacrylate portion of the ester contains a hydroxyl or amino group, or other reactive substituent which serves as a site for potential cross-linking. Examples of monomers of this type are; hydroxyethyl methacrylate, cyanoethyl acrylate, 1-butylaminoethyl methacrylate, glycidyl methacrylate, cyclohexyl acrylate and furfuryl acrylate. Anaerobic properties are imparted to the acrylate ester monomers by combining a peroxy polymerization initiator with them, as discussed more fully below.

One of the most preferable groups of polyacrylate esters which can be used in the sealants disclosed herein are polyacrylate esters which have the following general formula:

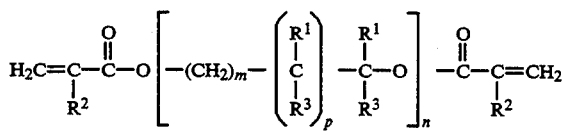

wherein $R^1$ represents a radical selected from the group consisting of hydrogen, lower alkyl of from one to about four carbon atoms, hydroxyl alkyl of from about four carbon atoms, and

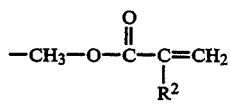

$R^2$ is a radical selected from the group consisting of hydrogen, halogen, and lower alkyl of from about four carbon atoms; $R^3$ is a radical selected from the group consisting of hydrogen, hydroxyl, and

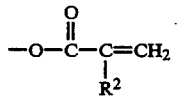

m is an integer equal to at least 1, e.g., from 1 to about 15 or higher, and preferably from 1 to about 8 inclusive; n is an integer equal to at least 1, e.g., from 1 to about 20 or more; and p is one of the following: 0, 1.

The polymerizable polyacrylate esters utilized in accordance with the present invention and corresponding to the above general formula are exemplified by, but not restricted to, the following materials: di- tri- and tetraethyleneglycol dimethacrylate, dipropyleneglycol dimethacrylate, polyethylene glycol dimethacrylate, di (pentamethyleneglycol) dimethacrylate, tetraethyleneglycol diacrylate, diglycerol tetramethacrylate, tetramethylene dimethacrylate, ethylene dimethacrylate, neopentyl glycol diacrylate and trimethylol propane triacrylate.

The foregoing monomers need not be in the pure state, but may comprise commercial grades in which inhibitors or stabilizers, such as polyhydric phenols, quinones, etc., are included. As used herein, the term "polymerizable polyacrylate ester monomer" includes not only the foregoing monomers in the pure and impure state, but also those other compositions which contain those monomers in amounts sufficient to impart the polymerization characteristics of polyacrylate esters to the compositions. It is also within the scope of the present invention to obtain modified characteristics for the cured composition by the utilization of one or more monomers within the above formula with other unsaturated monomers, such as unsaturated hydrocarbons, carbons, or unsaturated esters.

The preferred peroxy initiators for use in combination with the polymerizable acrylate or polyacrylate esters described above are the hydroperoxy polymerization initiators, and most preferably the organic hydroperoxides which have the formula $R^4OOH$, wherein $R^4$ generally is a hydrocarbon radical containing up to about 18 hydrocarbon atoms, preferably an alkyl, aryl or aralkyl radical containing from about one to about 12 carbon atoms. Typical examples of such hydroperoxides are cumene hydroperoxide, tertiary butyl hydroperoxide, methyl ethyl ketone hydroperoxide, and hydroperoxides formed by the oxygenation of various hydrocarbons, such as methylbutene, cetane and cyclohexene. Other organic substances, such as ketone and esters, including the polyacrylate esters represented by the above general formula, can be oxygenated to form hydroperoxy initiators. However, other peroxy initiators, such as hydrogen peroxide or materials such as certain organic peroxides or peresters which hydrolyze or decompose to form hydroperoxides frequently can be used. In addition, Belgium patent 692,031 describes peroxides having a half-life of less than 5 hours at 100° C. as suitable in somewhat related anaerobic systems.

The peroxy initiators which are used commonly comprise less than about 20 percent by weight of the combination of monomer and initiator since above that level, they will begin to adversely affect the strength of the adhesive bonds which are formed. Preferably, the peroxy initiator comprises from about 0.1 percent to about 10 percent by weight of the combination.

The preferred compressible graphite lubricant used in the pipe sealant compound is formed of "expanded" graphite flakes rather than "natural" graphite flakes. Natural flake graphite is generally found in the form of small flakes or powders which exhibit a very crystal perfection. Some commercial natural flake graphites are often contaminated with other minerals, e.g., chlorides, silicates, nitrates, etc., although the level of these contaminants is usually very low. It should be emphasized that the graphite flake that is used in the present pipe sealant is not a "natural" flake, but instead is an "expanded" graphite flake. The expanded graphite is formed of graphite flakes which have been subjected to an oxidizing environment at elevated temperature to expand the graphite, to render it flexible, compressible, resilient and cohesive.

Graphite is an allotropic form of the element carbon and consists of layers of hexagonally arranged carbon atoms in a planar condensed ring system. These layers of hexagonally arranged carbon atoms are substantially flat and are oriented or ordered so as to be substantially parallel and equidistant to one another. These layers, usually referred to as basal planes, are linked or bonded together and groups thereof are arranged in crystallites.

The graphite particles used in the present invention are prepared by expanding graphite flakes by a factor of at least 80 times in the "O" crystallographic axis direction, and then compressing the expanded flakes to form a cohesive structure. The expansion of the graphite flakes can be achieved by attacking the bonding forces between the layer planes in the internal structure of the graphite. The result of such attack is that the spacing between the superposed layers can be increased so as to effect a marked expansion in the direction perpendicular to the layers which is in the "C" axis direction. The expanded particles can be formed under light pressure into a foam material since the particles have the ability to adhere without a binder due to the large expansion.

The resiliency of the expanded graphite is stable under both thermal and mechanical stress and, due to its relatively low coefficient of friction and its peculiar planar structure, it acts as a solid lubricant.

The proportion of expanded graphite particles and anaerobic adhesive mixture of a polymerizable liquid acrylate ester monomer and a peroxy polymerization initiator can vary over a relatively wide range of from about 2% to about 50% by weight, with a preferred expanded graphite proportion being about 5% by weight. The preferred particle size is small enough to pass through a 325 U.S. Standard mesh screen, however, the size may be as large as 0.055" to accommodate the larger gap in drill pipe threads.

Other materials can be added to the mixture of polymerizable acrylate ester monomer and peroxy initiator, such as quinone or polyhydric phenol stabilizers, tertiary amine or amine accelerators, and other functional materials, such as; thickeners, coloring agents, etc. These additives are used to obtain commercially desired characteristics, i.e., suitable viscosity and shelf stability for extended periods (e.g., a minimum of one month). The presence of these additives is particularly important when peroxy initiators other than organic hydroperoxides are used. For a complete discussion of the anaerobic system and anaerobically curing compositions, reference is made to the following U.S. Pat. Nos. issued to Vernon K. Krieble: 2,895,950, 3,041,322, 3,203,941 3,218,305; and U.S. Pat. No. 3,300,547 issued to J. W. Gorman et al.

EXAMPLE

The following example is given to demonstrate a typical preferred composition of the compressible lubricant/polymerizable liquid anaerobic pipe sealant composition within the scope of the invention which can be prepared by mixing the ingredients described in table I in the approximate proportion indicated. The example is not intended to be a limitation upon the invention. Unless stated to the contrary, all ratios and percentages in the example are on a weight basis.

TABLE I

| Ingredient | Weight (%) |
| --- | --- |
| Polyethylene glycol dimethacrylate (avg. Molecular Weight = 330) | 12.8% |
| Polyethylene glycol di-2-ethylheoate (avg. Molecular Weight = 360) | 12.0% |
| 1-Octanol | 12.2% |
| Cumene hydroperoxide | 01.2% |
| Propoxylated bisphenal A fumarate resin | 28.0% |
| Fumed silica | 02.7% |
| Mica | 20.0% |
| Graphite | 11.1% |
| Stabilizer (quinone) | 150 parts per million by weight |

The compressible lubricant/pipe sealant described herein has particular utility when applied to threaded members because of its ability to maintain sealing integrity under cycling of tension, compression, bending, and thermal expansion and contraction loads. Frequently, the threaded connections of oil country tubular goods (OTCG), i.e., tubing, casing, drill pipe, need to be sealed to prevent leakage, or "locked" by some means to prevent loosening due to vibration. In a vertical oil or gas well, the threaded connection is subjected to tension when the pipe or tubing is being raised or lowered and compression when supported on the bottom of the well bore. In horizontal or deviated drilling operations the pipe, casing, or tubing may follow a curved path wherein the threaded connection is subjected to bending stresses which simultaneously places one side of the threaded connection in tension and the opposed side in compression. The threaded connections are also often exposed to extreme heat in the harsh environment in which drilling operations take place, which causes thermal expansion and contraction.

The present compressible lubricant/pipe sealant can conveniently be pre-applied to such products. In use, the pipe sealant will cure (polymerize) to provide both the sealing and locking function. The need to use an external or separately applied sealing or locking device is avoided.

Referring to the drawing, there is shown a portion of the thread detail in a metal-to-metal seal connection with API buttress threads. When the connection is made up, there is a gap G1 at the underside and a gap G2 at outer diameter of the thread tooth T. The gaps between the pin and box members of the threaded connection provide a helical leak path in the event of failure of the pipe sealant or thread galling. This helical leak path can also be opened due to the connection being subjected to cycling of tension, compression, bending, and thermal expansion and contraction.

The present compressible lubricant/pipe sealant compound C is applied in a liquid state to either the pin or box threads or to both threaded surfaces, in any suitable manner as, for example, by brushing, mechanical applicator, ribbon applicator, or sponge. So long as the parts so coated remain exposed to the air, the sealant remains in its liquid state. However, when the parts are joined such that the interengaging surfaces are no longer exposed to the air, then the sealant cures to the solid state. The presence of the metal to which the sealant is applied can also initiate and thereby accelerate the curing process. The compound fills all voids including microgrooves which are formed in the metal resulting in elimination of leak paths for gases and liquids.

Thus, the compound has the ability to change from a liquid with sufficient lubricity to assemble standard API and premium threaded connections without galling and then transform and fix itself into a continuous solid blocking or sealing agent in the gaps of the thread form to prevent the spiral leak path from developing. The expanded (compressible) graphite has a memory and, as part of the anaerobic fixing compound, allows the pipe sealant to maintain its sealing integrity under cycling of tension, compression, bending, and thermal expansion and contraction. Although a single thread form has been shown by way of example, it should be understood that the compressible lubricant/pipe sealant works equally well with other pipe, casing, and tubing round threaded connections, and other metal-to-metal premium thread connections commonly used in oil country tubular goods (OCTG).

The compressible lubricant/pipe sealant can also provide a sound back-up seal which is more practical and reliable than "Teflon" brand O-rings. The sealant of the present invention provides a compressible and resilient seal without the need to machine expensive grooves (which weaken the pipe) as is required for the "Teflon" O-ring seal.

The compressible lubricant/pipe sealant product of the present invention is shelf stable and capable of withstanding normal storage and shipping conditions. It will not cure (polymerize) as long as maintained in the liquid form in low density polyethylene containers and in contact with air or other supplies of oxygen. But when confined between nonporous surfaces or otherwise placed in an oxygen free atmosphere, curing of the sealant will begin. The presence of the metal to which the sealant is applied can also initiate and thereby accelerate the curing process.

While curing can take place at room temperature and in the absence of accelerators, the time required to achieve sealing can be shortened by subjecting the assembly utilizing the compressible lubricant/pipe sealant to moderate temperatures, such as from about 125° F. to about 250° F., or by treating the compound or one or more of the surfaces to be sealed with a polymerization accelerator immediately before the assembly operation. A typical class of such accelerators (organic polymines) is disclosed in U.S. Pat. No. 3,203,941 issued to Vernon K. Krieble.

The constituents of the composition can be selectively varied to control its lubricity which also affects the break-out torque of the joint to which it is applied, and preferably make the break-out torque substantially greater then the make-up torque. Excellent seals can be obtained using lower grade pipe, and the pin and box members can be made up with the application of lower torque to the assembly without reducing the sealing capability of the connection.

While this invention has been described fully and completely with special emphasis upon a preferred embodiment, it should be understood that within the scope of the appended claims the invention may be practiced otherwise than as specifically described herein.

I claim:

1. A compressible graphite lubricant and anaerobic pipe sealant composition which functions as a liquid lubricant when exposed to air and in the absence of air cures to form a compressible sealant with memory, the composition comprising;
   a mixture of a polymerizable acrylic ester monomer and a peroxy polymerization initiator therefore, and
   compressible expanded graphite particles suspended in said mixture functioning as a lubricant,
   said peroxy polymerization initiator being present in an amount sufficient to polymerize said monomer at room temperature in the substantial absence of oxygen, and
   said mixture of polymerizable acrylic ester monomer and peroxy polymerization initiator being present in an amount of from about 50 percent to about 95 percent by weight of the total weight of said mixture and said compressible expanded graphite particles, and
   said composition remaining in a liquid state in the presence of air and in the absence of air curing to a solid compressible state to form a sealant with memory.

2. The composition according to claim 1 wherein; said expanded graphite particles are formed from graphite flakes expanded by a factor of at least 80 times in the "O" crystallographic axis direction, and having spaces between superposed layer planes sufficient to effect a marked expansion in the direction perpendicular to the layers which is in the "C" axis direction.

3. The composition according to claim 1 wherein; said expanded graphite particles are present in an amount of from about 2 percent to about 50 percent by weight of the total weight of said mixture of polymerizable acrylic ester monomer and peroxy polymerization initiator.

4. The composition according to claim 1 wherein; said expanded graphite particles present are of a size sufficient to pass through a 325 U.S. Standard mesh screen.

5. The composition according to claim 1 wherein; said expanded graphite particles present are of a size ranging from about 0.037" to about 0.055".

6. The composition according to claim 1 including; a non-polymerizable plasticizer, a polymeric thickener, a silica thixotropic agent, and an inert mineral filler, said mixture of polymerizable acrylic ester monomer and peroxy polymerization initiator being present in an amount of from about 50 percent to about 95 percent by weight of the total weight of said composition.

7. The composition according to claim 1 wherein said peroxy polymerization initiator is a hydroperoxy polymerization initiator.

8. The composition according to claim 1 wherein said polymerizable acrylate ester is a polymerizable polyacrylate ester monomer.

9. The composition according to claim 1 wherein said peroxy polymerization initiator is a hydroperoxy polymerization initiator comprising from about 0.1 percent to about 10.0 percent by weight of the total weight of said mixture, and said polymerizable acrylate ester monomer is a polymerizable polyacrylate ester monomer.

10. The composition according to claim 9 wherein said polymerizable acrylate ester monomer has the general formula:

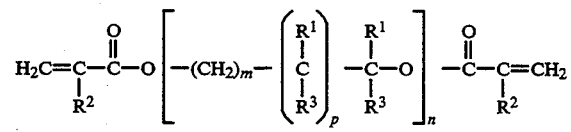

wherein $R^1$ represents a radical selected from the group consisting of hydrogen, lower alkyl of from one to about four carbon atoms, hydroxyl alkyl of from about four carbon atoms, and

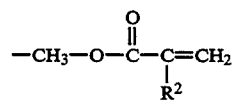

$R^2$ is a radical selected from the group consisting of hydrogen, halogen, and lower alkyl of from about four carbon atoms; $R^3$ is a radical selected from the group consisting hydrogen, hydroxyl, and

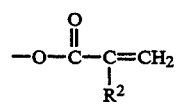

m is an integer equal to at least 1, e.g., from 1 to about 15 or higher, and preferably from 1 to about 8 inclusive; n is an integer equal to at least 1, e.g., from 1 to about 20 or more; and p is one of the following: 0, 1.

11. In a threaded pipe joint including pin and box members having mating threaded surfaces, the improvement comprising:
a compressible graphite lubricant and anaerobic pipe sealant composition applied to at least a portion of the threaded area of at least one member in an uncured liquid state in the presence of air;
said composition comprising a mixture of a polymerizable acrylic ester monomer and a peroxy polymerization initiator therefore, and compressible expanded graphite particles suspended in said mixture to function as a lubricant, said peroxy polymerization initiator being present in an amount sufficient to polymerize said monomer at room temperature in the substantial absence of oxygen, and said mixture of polymerizable acrylic ester monomer and peroxy polymerization initiator being present in an amount of from about 50 percent to about 95 percent by weight of the total weight of said mixture and said compressible expanded graphite particles; and
said composition remaining in a liquid state in the presence of air and serving as a lubricant during assembly, and after assembly in the absence of air, said composition curing to a solid state to form a compressible resilient seal.

12. The threaded pipe joint according to claim 11 wherein;
said expanded graphite particles are formed from graphite flakes expanded by a factor of at least 80 times in the "O" crystallographic axis direction, and having spaces between superposed layer planes sufficient to effect a marked expansion in the direction perpendicular to the layers which is in the "C" axis direction.

13. The threaded pipe joint according to claim 11 wherein;
said expanded graphite particles are present in an amount of from about 2 percent to about 50 percent by weight of the total weight of said mixture of polymerizable acrylic ester monomer and peroxy polymerization initiator.

14. The threaded pipe joint according to claim 11 wherein;
said expanded graphite particles present are of a size sufficient to pass through a 325 U.S. Standard mesh screen.

15. The threaded pipe joint according to claim 11 wherein;
said expanded graphite particles present are of a size ranging from about 0.037" to about 0.055".

16. The threaded pipe joint according to claim 11 wherein said sealing composition includes;
a non-polymerizable plasticizer,
a polymeric thickener,
a silica thixotropic agent, and
an inert mineral filler,
said mixture of polymerizable acrylic ester monomer and peroxy polymerization initiator being present in an amount of from about 50 percent to about 95 percent by weight of the total weight of said composition.

17. The threaded pipe joint according to claim 11 wherein
said peroxy polymerization initiator is a hydroperoxy polymerization initiator.

18. The threaded pipe joint according to claim 11 wherein
said polymerizable acrylate ester is a polymerizable polyacrylate ester monomer.

19. The threaded pipe joint according to claim 1 wherein
said peroxy polymerization initiator is a hydroperoxy polymerization initiator comprising from about 0.1 percent to about 10.0 percent by weight of the total weight of said mixture, and
said polymerizable acrylate ester monomer is a polymerizable polyacrylate ester monomer.

20. The threaded pipe joint according to claim 19 wherein
said polymerizable acrylate ester monomer has the general formula:

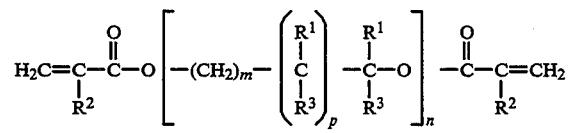

wherein $R^1$ represents a radical selected from the group consisting of hydrogen, lower alkyl of from one to about four carbon atoms, hydroxyl alkyl of from about four carbon atoms, and

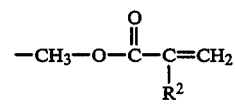

$R^2$ is a radical selected from the group consisting of hydrogen, halogen, and lower alkyl of from about four carbon atoms; $R^3$ is a radical selected from the group consisting hydrogen, hydroxyl, and

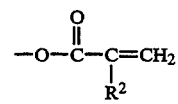

m is an integer equal to at least 1, e.g., from 1 to about 15 or higher, and preferably from 1 to about 8 inclusive; n is an integer equal to at least 1, e.g., from 1 to about 20 or more; and p is one of the following: 0, 1.

21. A method of forming a compressible resilient seal in a threaded connection between pin and box members having mating threaded surfaces comprising the steps of:
applying a compressible graphite lubricant and anaerobic pipe sealant composition according to claim 1 in an uncured liquid state in the presence of air to at least a portion of a threaded area of at least one said member;
while said composition is in the uncured liquid state, screwing said pin and box members together;
said composition in the uncured state functioning as a lubricant to facilitate the threaded engagement of said pin and box members and filling the voids between the engaged threaded portions;
as the voids between the threaded portions become filled with said composition and said pin and box members become threadedly engaged, said composition between the interengaging thread surfaces is no longer exposed to air; and
allowing said composition to cure to a solid compressible state and form a resilient seal.

* * * * *